United States Patent
Riggs et al.

(10) Patent No.: US 7,976,385 B2
(45) Date of Patent: Jul. 12, 2011

(54) GAME CONTROLLER WITH SENSITIVITY ADJUSTMENT

(75) Inventors: Andrew J. Riggs, Lewisville, TX (US); Michael Hammond, Madison, WI (US); Chan Kei Shek, Yuen Long (HK)

(73) Assignee: Mattel, Inc., El Segundo, CA (US)

( * ) Notice: Subject to any disclaimer, the term of this patent is extended or adjusted under 35 U.S.C. 154(b) by 947 days.

(21) Appl. No.: 11/127,534

(22) Filed: May 11, 2005

(65) Prior Publication Data

US 2005/0255918 A1  Nov. 17, 2005

Related U.S. Application Data

(63) Continuation-in-part of application No. 10/843,920, filed on May 12, 2004, now Pat. No. 7,297,060.

(60) Provisional application No. 60/570,003, filed on May 11, 2004.

(51) Int. Cl.
*G06F 17/00* (2006.01)
(52) U.S. Cl. ............................................. 463/36; 463/1
(58) Field of Classification Search .................... 463/36, 463/1, 37–38; 273/148 B; 345/156, 159, 345/161; 434/62
See application file for complete search history.

(56) References Cited

U.S. PATENT DOCUMENTS

| | | | |
|---|---|---|---|
| 4,846,486 A | 7/1989 | Hobson | |
| 5,042,874 A | 8/1991 | Williams | |
| 5,054,771 A | 10/1991 | Mansfield | |
| 5,195,746 A | 3/1993 | Boyd et al. | |
| 5,290,034 A | 3/1994 | Hineman | |
| 5,437,453 A | 8/1995 | Hineman | |
| 5,453,758 A * | 9/1995 | Sato | 345/158 |
| 5,556,107 A | 9/1996 | Carter | |
| 5,699,059 A * | 12/1997 | Hiller | 341/72 |
| 5,882,079 A | 3/1999 | Yang | |
| 5,911,634 A | 6/1999 | Nidata et al. | |
| 5,989,123 A | 11/1999 | Tosaki et al. | |
| 6,033,014 A | 3/2000 | Nightengale | |
| 6,044,772 A | 4/2000 | Gaudette et al. | |
| 6,053,814 A * | 4/2000 | Pchenitchnikov et al. | 463/36 |

(Continued)

FOREIGN PATENT DOCUMENTS

EP  2005/105246 A 1   11/2005

(Continued)

OTHER PUBLICATIONS www.game-revolution.com/games/hardware/intensor.htm, printed on Jan. 6, 2004.

(Continued)

*Primary Examiner* — David L Lewis
*Assistant Examiner* — Robert Mosser
(74) *Attorney, Agent, or Firm* — Edell, Shapiro & Finnan LLC

(57) ABSTRACT

The disclosure relates to a game controller in electrical communication with a video game system adapted to display a video game. The game controller includes at least one control device adapted for substantially uninterrupted control of an aspect of the video game, the at least one control device having at least a first sensitivity level and a second sensitivity level, and an adjustment device adapted to change the first sensitivity level to the second sensitivity level of the at least one control device without interrupting the substantially uninterrupted control.

25 Claims, 3 Drawing Sheets

U.S. PATENT DOCUMENTS

| | | | |
|---|---|---|---|
| 6,075,868 | A | 6/2000 | Goldfarb et al. |
| 6,083,106 | A | 7/2000 | McDowell |
| 6,203,432 | B1 * | 3/2001 | Roberts et al. .................. 463/37 |
| 6,241,612 | B1 | 6/2001 | Heredia |
| 6,279,906 | B1 | 8/2001 | Sanderson et al. |
| 6,283,546 | B1 | 9/2001 | Hill |
| 6,478,679 | B1 | 11/2002 | Himoto et al. |
| 6,538,666 | B1 | 3/2003 | Ozawa et al. |
| 6,568,334 | B1 | 5/2003 | Gaudette et al. |
| 6,663,058 | B1 | 12/2003 | Peterson et al. |
| 6,776,104 | B2 | 8/2004 | Herbst |
| 6,803,676 | B2 | 10/2004 | Tanaka et al. |
| 6,827,648 | B2 | 12/2004 | Peng et al. |
| 6,881,147 | B2 | 4/2005 | Naghi et al. |
| 6,905,414 | B2 | 6/2005 | Danieli et al. |
| 6,935,959 | B2 | 8/2005 | Danieli et al. |
| 7,085,722 | B2 | 8/2006 | Luisi |
| 2002/0052237 | A1 | 5/2002 | Magill |
| 2003/0171190 | A1 | 9/2003 | Rice |
| 2003/0193416 | A1 | 10/2003 | Ogata et al. |
| 2005/0159219 | A1 | 7/2005 | Oswald |
| 2005/0282632 | A1 | 12/2005 | James-Herbert |

FOREIGN PATENT DOCUMENTS

| | | |
|---|---|---|
| GB | 2329829 A | 4/1999 |
| GB | 2406504 A | 4/2005 |
| JP | 11-179051 | 7/1999 |
| WO | 99/30789 | 6/1999 |
| WO | 00/67864 | 11/2000 |
| WO | 2005/110569 A3 | 11/2005 |

OTHER PUBLICATIONS

International Search Report, dated Jan. 29, 2007.

Office Action dated Jul. 20, 2010 for EP patent application No. 05 750 001.9-2218 (4 pages).

Office Action dated Sep. 11, 2009 for EP patent application No. 05 750 001.9-2218 (3 pages).

* cited by examiner

GAME CONTROLLER WITH SENSITIVITY ADJUSTMENT

RELATED APPLICATION

This application claims the benefit of U.S. Provisional Application Ser. No. 60/570,003, filed May 11, 2004, the entire contents of which are incorporated herein by reference, and is a continuation-in-part of U.S. application Ser. No. 10/843,920, filed May 12, 2004, now U.S. Pat. No. 7,297,060 and entitled "Transportable Apparatus for a Game System", the entire contents of which are herein incorporated by reference.

BACKGROUND

The use of controllers, and more particularly game controllers, with personal computers or gaming systems is well known. Typical game controllers such as joysticks, steering wheels, throttles, and control pads utilize buttons, slide switches, and/or rotary switches that the user manipulates using their fingers and one or both thumbs. The user may also be required to move the relative position of their hands, for example to simulate steering wheel movement. Additionally, some controllers may include one or more foot-operable switches, for example for use with a car or plane simulator.

Steering wheels that electronically interface with video game consoles are available as an accessory. There are a variety of driving games designed for video game formats currently on the market, but due to the variations in the types of games and the game play, there is a need to be able to adjust the sensitivity of the steering. The ability to adjust the reaction of the game to the movement of the steering wheel would serve to increase the skill level of the player and improve scores. As an example, car-racing games that involve evading obstacles may require a different sensitivity than a game that pits one car against another on a track.

Conventional steering wheels that give a user the ability to adjust the sensitivity of steering actions must stop the game action (i.e., the game must be paused or halted to make any sensitivity adjustment).

Therefore, there a need exists for an improved controller for video game systems.

SUMMARY

In one embodiment, a game controller in electrical communication with a video game system adapted to display a video game is provided. The game controller includes at least one control device adapted for substantially uninterrupted control of an aspect of the video game, the at least one control device has at least a first sensitivity level and a second sensitivity level, and an adjustment device adapted to change the first sensitivity level to the second sensitivity level of the at least one control device without interrupting the substantially uninterrupted control.

In another embodiment, a method of adjusting video game control sensitivity is provided. The method includes the steps of activating a video game, which is coupled to a control device adapted for substantially uninterrupted control of an aspect of the video game, and adjusting the sensitivity of the control device without interrupting said substantially uninterrupted control.

In another embodiment, a computer program product including a computer usable medium having computer readable program code embodied therein configured to adjust the sensitivity of a video game control device is provided. The computer program product includes computer readable code configured to cause a computer to determine whether the user has adjusted the sensitivity of the video game control device, and computer readable code configured to cause a computer to generate a signal that adjusts the sensitivity of the video game control without interrupting control of the video game control device.

Additional features and advantages of the present invention are described in, and will be apparent from, the following Detailed Description and the figures.

BRIEF DESCRIPTION OF THE DRAWINGS

Referring to the drawings which form a part of this disclosure.

DETAILED DESCRIPTION OF EXEMPLARY EMBODIMENTS

Figure 1:
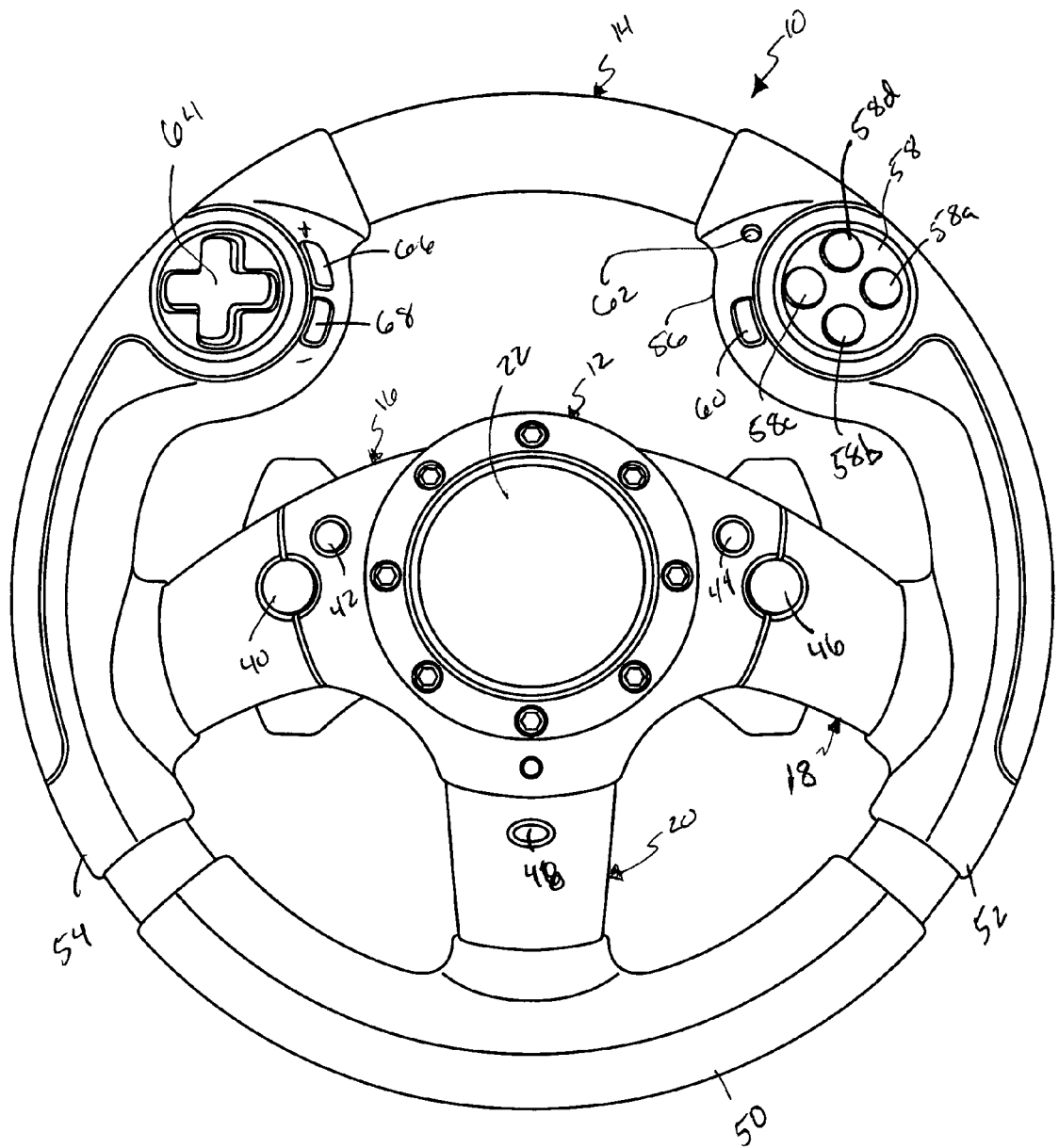
FIG. 1 is a top plan view of a preferred embodiment of the present invention.
Figure 2:
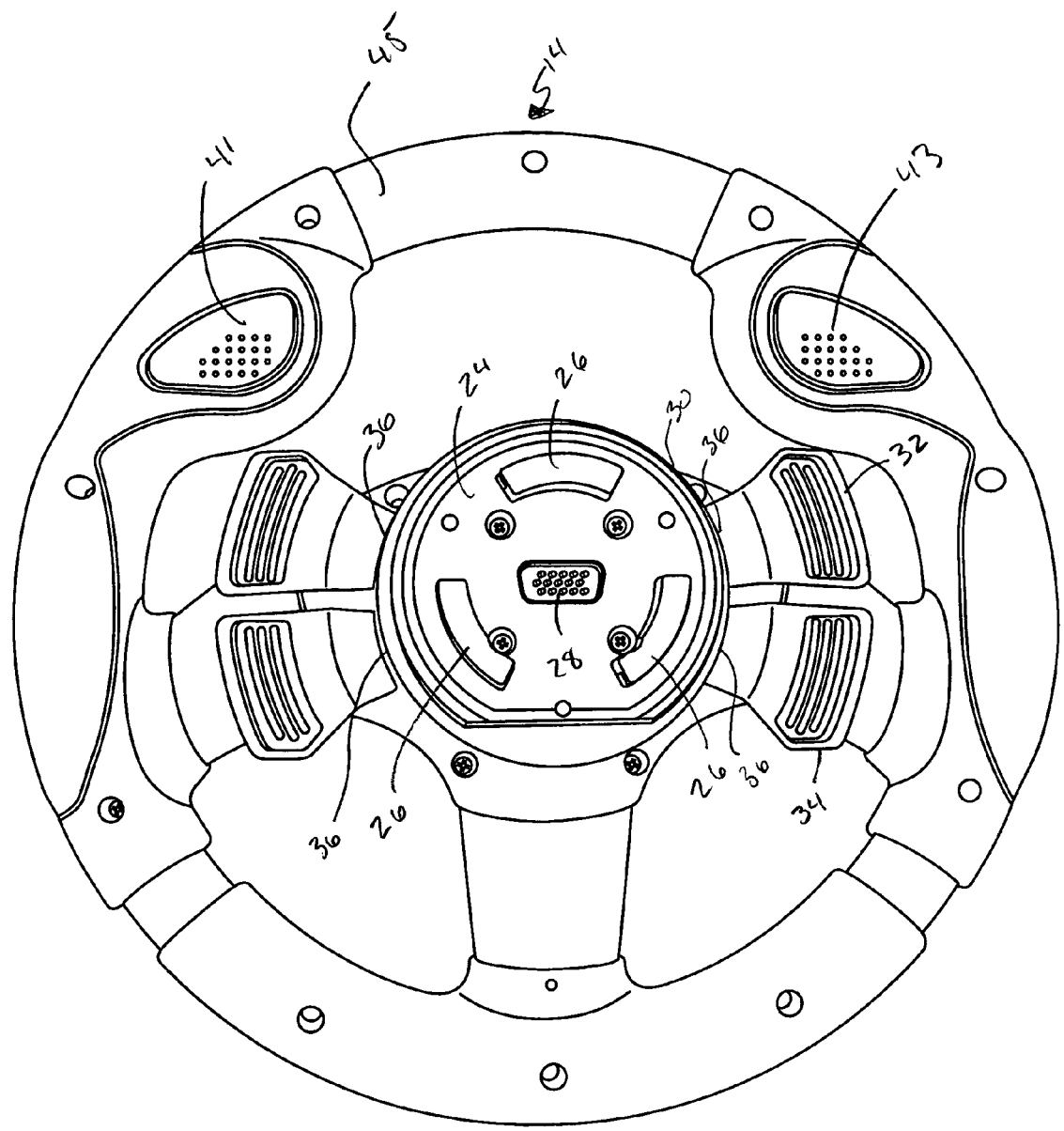
FIG. 2 is a bottom plan view of the steering wheel of FIG. 1.
Figure 3:
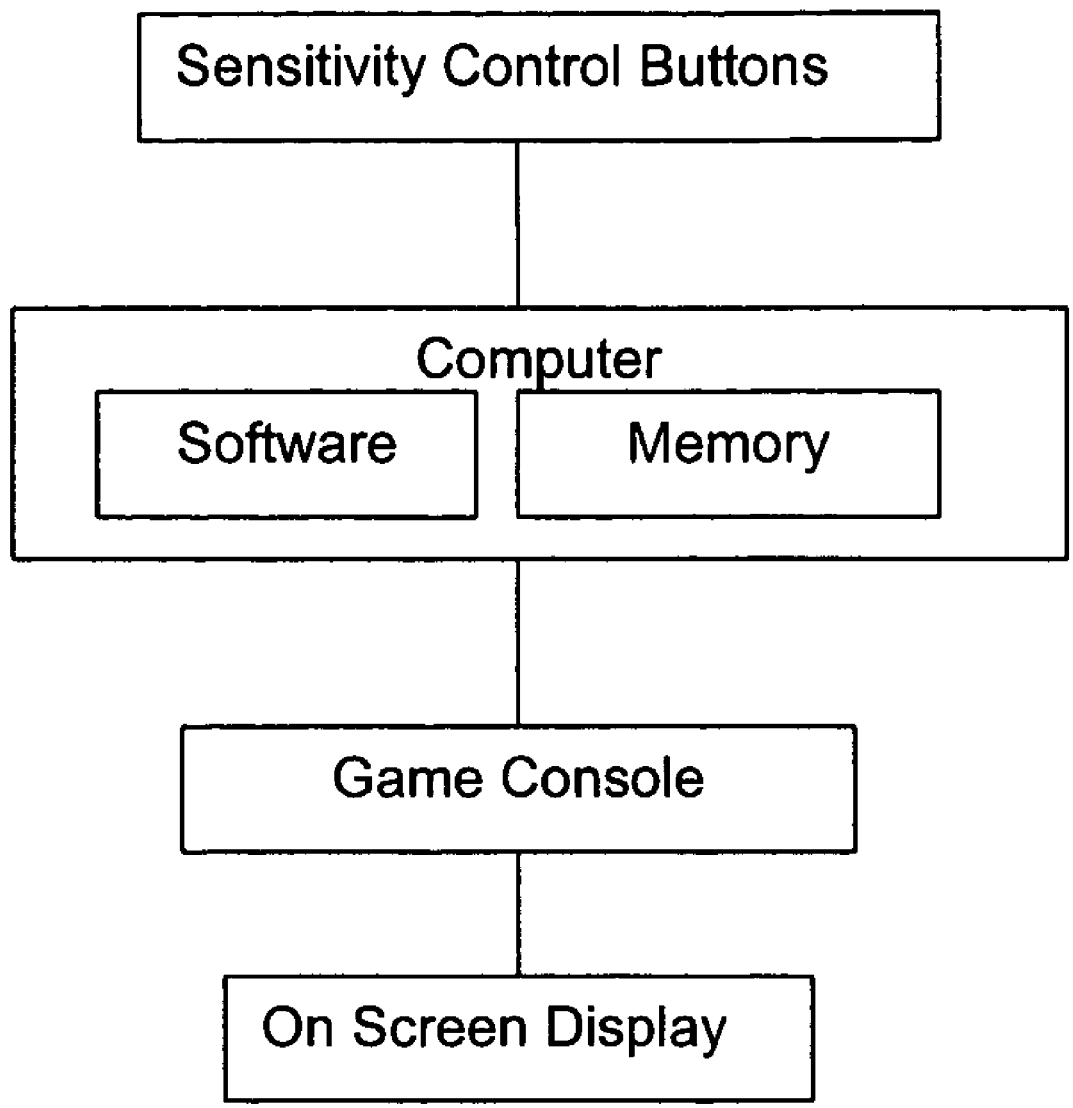
FIG. 3 illustrates a schematic of a general purpose system upon which the sensitivity of the device of FIG. 1 can be adjusted.

FIGS. 1-3 illustrate a controller that is used in a video game according to an embodiment of the present invention. More particularly, FIGS. 1-3 illustrate a steering wheel that is used in video game simulations or on screen movement or control of cars or other vehicles, such as planes and boats; however, it is noted that this game controller can be any type of controller desired and used for any game desired and is not limited to the type of vehicle or a vehicle at all. The present device is preferably used for game systems, such as PLAYSTATION, PLAYSTATION ONE, PLAYSTATION 2, XBOX, and GAMECUBE, but can be used in any type of video game system or computer system desired. Preferably, the game controller is in electronic communication with a game system or computer and is adapted or configured for substantially uninterrupted or uninterrupted control of an aspect of a video game. For example, the game controller preferably controls on screen movement of a vehicle or other aspect of a video game.

As shown specifically in FIGS. 1 and 2, the present device is preferably a steering wheel 10 and is plastic and substantially circular or wheel-shaped with a central hub 12, a peripheral portion 14 and three spokes 16, 18 and 20; however, it is noted that the steering wheel can be formed from any material desired, have any shape or configuration desired and is not limited to the specific shape described herein.

Central hub 12 is generally circular and has a front portion 23 and a back portion 25. Front portion 23 is preferably rigidly connected to the spokes 16, 18 and 20 and has a front surface or side 22. Surface 22 can have ornamental designs or logos, if desired.

Back portion 25 is preferably generally circular with a back surface or side 24 and is rotatably coupled to front portion 23. The back side 24 has interlocking or latch mechanisms or tabs 26 extending therefrom. Tabs 26 are adapted to allow the steering wheel 10 to attach to a steering column (not shown) that is in electrical communication with a game system, computer or other suitable device. Furthermore, a pin connector 28 is located at about the center (or any other portion) of the back side and is adapted to couple to a suitable connector on the steering column to allow electrical communication between the steering wheel and the game system or computer.

Back portion 25 of the hub can pivot relative to the front portion 23 such that when the hub is coupled to the steering column it acts as a steering wheel. In other words, the wheel can turn through a predetermined arc such that on screen activity can be controlled in a substantially continuous or uninterrupted manner. Preferably, the steering wheel has a center or neutral position to which the wheel generally returns when no outside forces are applied thereto. The wheel can be turned to the left or right of the central or neutral position through a predetermined arc. The wheel can have end stops such that the wheel can only turn through a specific radial arc, or the wheel can turn through one complete circle, multiple circles or have no rotational limit. Signals are sent through the pin connector 28 through the steering column and into a computer, video game console or video game system, such that the computer and/or computer software (i.e., computer readable code) is capable of determining the distance or movement of the steering wheel and effect on screen movement of a vehicle or other on screen aspect of the game.

Extending from the periphery 30 of the central hub 12 are four paddles 32, 34, 36 and 38. Each paddle is substantially similar to each other paddle and is coupled to the central hub such that it can pivot toward the front side of the central hub. Each paddle is adapted to pivot at the proximal end 36 and activates a switch or mechanism within the central hub, if desired. It is noted that it is not necessary to have any paddles or specifically four paddles and the device can have no paddles or any number of paddles desired. Additionally, it is not necessary for each of the paddles to be adapted to pivot or when pivoted to activate a switch or mechanism. In other words, one, none, all or any number of the paddles can be for ornamental purpose only, and not specifically function for any on screen gaming action.

Additionally control buttons such as buttons 41 and 43 can be positioned on the rear portion or surface 45 of the peripheral portion 14. Preferably, these buttons are sized and configured and positioned in a convenient location or position for use with a finger or multiple fingers, but each button can be sized and configured and positioned in any suitable position or location desired. For example, buttons 41 and 43 can be positioned on the spokes, the central hub, the peripheral portion or any portion or combination of portions thereof.

Spokes 16, 18 and 20 extend from the front portion 21 of central hub 12 to the peripheral portion 14 and connect hub 12 to peripheral portion 14. Each spoke can be any suitable shape and configuration desired and can partially surround, completely surround or merely be attached to the hub 12. The spokes can have game play buttons or switches located thereon. For example, the spokes can have buttons 40, 42, 44, 46 and 48 thereon. The buttons can be located on an individual spoke, or partially one spoke and the partially on the hub 12, partially on one spoke and the peripheral portion, partially on multiple spokes (i.e., at a location where two spokes intersect or meet) or on any other suitable position. Furthermore, it is noted that there can be any number of spokes desired.

The peripheral portion 14 preferably is generally tubular or has a cross section that is substantially circular, but can be any shape or configuration desired. Additionally, the peripheral portion can have grips or raised portions 50, 52 and 54 that can enhance gripping or merely can be for aesthetic value. However, it is not necessary to have any grips or specifically three grips. In fact there can be any number of grips desired or no grips.

Grip 52 has an arcuate, inwardly extending protrusion thereon. This enables a configuration of control buttons 58 to be positioned on the peripheral portion 14 or wheel 10. The configuration of control buttons preferably includes four buttons 58*a-d*, which are used to control certain on-screen functions and/or actions. However, it is noted that is not necessary to have this specific configuration of buttons and there can be any number (including zero) of buttons positioned on the peripheral portion of the wheel or any other type of control device, such as a thumb stick, a directional pad or any type desired.

Adjacent the configuration of control buttons 58 is an additional button 60, which activates the acceleration lock feature of the game. Button 60 is adapted to allow setting of the acceleration level. That is, if the acceleration of the on-screen car or other device is increased after setting or locking the acceleration level, once you stop accelerating, the acceleration level will automatically drop back to the set point. When the acceleration level is set or locked a light will be lit indicating that the acceleration lock is set.

Grip 54 has an arcuate, inwardly extending protrusion thereon. This enables a directional control pad 64 to be positioned on the peripheral portion 14 of wheel 10. The directional pad 64 is preferably a plus shape and configured to control certain on-screen functions and/or actions as is known in the art. However, it is noted that is not necessary to have this specific configuration of a directional pad and there type of control device positioned thereon, such as a thumb stick, actions buttons, etc.

The steering wheel 10 includes an adjustment device that is adapted to alter or change the sensitivity level of at least on control device without interrupting the signal sent by the control device. Preferably, the adjustment device is configured to affect the sensitivity of the movement of the steering wheel relative to the steering column. However, it is noted that the adjustment device can adjust the sensitivity of any desired control device or multiple control devices.

The adjustment device includes two buttons 66 and 68 that are preferably adjacent the directional pad, but can be positioned in any suitable place or position on the device. Buttons 66 and 68 control the sensitivity of the steering mechanism. Preferably buttons 66 and 68 are marked (+) and (−), respectively. By pressing the (+) or (−) button, a signal is transmitted to software or a computer usable medium that increases or decreases the sensitivity of the steering angle or the maximum steering angle. For example, in one embodiment, with a reduced maximum steering angle, rotation of the steering wheel allows the maximum steering in the game to be achieved with less rotation of the wheel, thus increasing the sensitivity. Conversely, the steering sensitivity is reduced by increasing the maximum angle that the steering wheel will turn to achieve maximum steering in the game. It is noted that the sensitivity control device can be formed in any manner desired and does not necessarily include two buttons as described herein.

The sensitivity change is governed by two parameters; (1) the value obtained when the voltage signal from the steering wheel is digitized by a 12-bit Analog/Digital Converter and (2) the sensitivity level that is set by pressing the (+)/(−) button. Depending on the sensitivity level that is set or adapted to be stored in memory in the steering mechanism or computer usable medium, the resolution of the output is increased or decreased by inserting or removing values between the table elements.

For example, in one embodiment, more values inserted in the table will give greater sensitivity and vice versa. The wheel output value or the value that is assigned to a predetermined movement of the steering mechanism will form part of a new output that is sent to the game console.

The preferred resolution for a game console output report for a button/wheel is 8-bits (256 steps) and the Analog/Digital converter used for input is 12-bits (4096 steps). Look-up tables with 256 elements can be setup for each sensitivity level for the input to output mapping. The software or computer readable code will check the current sensitivity level and use the dedicated table for that sensitivity level to get the output value. As the resolution from the input side is higher than the output side, the extra details from the input can be used to refine the output value by interpolation of two adjacent elements from the table.

The selected sensitivity of the controller can be stored for further use in memory of the steering wheel, if desired, or the sensitivity can revert to a default level if there is no suitable memory in the wheel. The memory can be any suitable type of memory and can store the sensitivity level or value for a limited time or an indefinite time.

When the sensitivity is high, a small wheel angle change will result in a large change in output report value. The benefits of software interpolation can easily be seen in the table below:

| Without software interpolation | | | | | | | | | | |
|---|---|---|---|---|---|---|---|---|---|---|
| 100 | 100 | 100 | 100 | 100 | 110 | 110 | 110 | 110 | 110 | 120 |
| With software interpolation | | | | | | | | | | |
| 100 | 102 | 104 | 106 | 108 | 110 | 112 | 114 | 116 | 118 | 120 |

As can be seen from the above table, software interpolation can give a more refined value for each button in a report to the game console (e.g. when a user turns the wheel slowly at high sensitivity, the output report value for the wheel would be as reflected).

In other words, as shown in FIG. 3, the steering mechanism and/or memory is adapted to accept a first sensitivity level that is either a default value or a value altered by the sensitivity control buttons 66 and 68. The first sensitivity level sends a signal to the game console that effects a first predetermined level of movement of the on screen vehicle or display based on a first predetermined distance of movement of the steering mechanism. Additionally, when the first sensitivity level is changed to the second sensitivity level, the steering mechanism and/or memory is adapted to accept the second sensitivity level. The second sensitivity level affects a second predetermined level of movement of the on screen vehicle based on a second predetermined distance of movement of said steering mechanism.

Preferably, in this specific example, the second predetermined level of movement is less that the first predetermined level of movement and the second predetermined level of distance is greater than the than the first level of predetermined level of distance. That is, when the steering wheel is moved in small increments, the on screen vehicle turns in large increments, thus making the on screen vehicle more responsive for sharper quicker turns. This exemplary model of the first and second sensitivity levels is merely for ease of understanding the overall disclosure and is not meant to limit the invention in any manner.

For example, if desired the second predetermined level of movement could be less than the first predetermined level of movement and the second predetermined level of distance could be less than the first level of predetermined level of distance. Furthermore, when the first sensitivity value is accepted by the steering mechanism and/or memory the movement of the on screen vehicle is incapable of movement at the second predetermined level of movement. However, when the second sensitivity value is accepted by the steering mechanism and/or memory, the movement of the on screen vehicle is capable of movement at least one of (and preferably both) the first level of predetermined movement and the second predetermined level of movement. That is when the steering mechanism is turned in small increments, the on screen vehicle turns in small increments, thus making the steering wheel more sensitive (i.e., fine tuning the responsiveness of the vehicle for precise movement).

It is noted that any of the above described control devices, including action buttons, directions pads, steering wheel movement or any other aspect of controlling the on screen action and/or movement are optional and not all above described control devices are necessary. Any of these control devices can be ornamental, nonfunctional or nonexistent and any combination of the each and all of the above described control devices can be used.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A game controller in electrical communication with a video game system adapted to display a video game, comprising:
    at least one control device adapted for substantially uninterrupted control of an aspect of the video game, said at least one control device having at least a first sensitivity level and a second sensitivity level;
    an adjustment device adapted to allow a user to manually change the first sensitivity level to the second sensitivity level of the at least one control device without interrupting said substantially uninterrupted control.

2. A game controller according to claim 1, wherein said game controller is steering mechanism adapted to control an on screen vehicle.

3. A game controller according to claim 2, wherein said steering mechanism is adapted to accept the first sensitivity value, said first sensitivity level effecting a first predetermined level of movement of said on screen vehicle based on a first predetermined distance of movement of said steering mechanism; and
    when the first sensitivity level is changed to the second sensitivity value, the steering mechanism is adapted to accept the second sensitivity level, said second sensitivity level effecting a second predetermined level of movement of said on screen vehicle based on a second predetermined distance of movement of said steering mechanism.

4. A game controller according to claim 3, wherein said second predetermined level of movement is less than said first predetermined level of movement and said second predetermined level of distance is less than said first level of predetermined level of distance.

5. A game controller according to claim 3, wherein when said first sensitivity value is accepted by said steering mechanism, said movement of said on screen vehicle is incapable of movement at said second predetermined level of movement.

6. A game controller according to claim 3, wherein when said second sensitivity value is accepted by said steering mechanism, said movement of said on screen vehicle is capable of movement at least one of said first level of predetermined movement and said second predetermined level of movement.

7. A game controller according to claim 1, further comprising memory and at least one of said first and second sensitivity levels is assigned a value and stored in said memory.

8. A game controller according to claim 7, wherein said sensitivity value reverts to a default level if there is no suitable sensitivity value stored in said memory.

9. A game controller according to claim 1, wherein the adjustment device is configured to allow the user to adjust the sensitivity of the device from a first predetermined sensitivity level to a second predetermined sensitivity level, the second predetermined level being selected from a plurality of different predetermined sensitivity levels.

10. A method of adjusting video game control sensitivity, comprising the steps of
activating a video game, the video game being coupled to a game controller having a control device that is adapted for substantially uninterrupted control of an aspect of the video game,
manually adjusting the sensitivity level of the control device without interrupting said substantially uninterrupted control.

11. A method according to claim 10, wherein the step of manually adjusting the sensitivity level includes adjusting the sensitivity of the device from a first predetermined sensitivity level to a second predetermined sensitivity level, the second predetermined level being selected from a plurality of different predetermined sensitivity levels.

12. A method according to claim 10, wherein the step of activating a video game includes the step of activating a video game coupled to a steering mechanism adapted to control an on screen vehicle.

13. A method according to claim 12, wherein the step of adjusting the sensitivity level includes altering a first sensitivity value that effects a first predetermined level of movement of said on screen vehicle based on a first predetermined distance of movement of said steering mechanism to a second sensitivity value that effects a second predetermined level of movement of said on screen vehicle based on a second predetermined distance of movement of said steering mechanism.

14. A method according to claim 13, wherein said second predetermined level of movement is less than said first predetermined level of movement and said second predetermined level of distance is less than said first level of predetermined level of distance.

15. A method according to claim 13, wherein when said first sensitivity value is accepted by said steering mechanism, said movement of said on screen vehicle is incapable of movement at said second predetermined level of movement.

16. A method according to claim 13, wherein when said second sensitivity value is accepted by said steering mechanism, said movement of said on screen vehicle is capable of movement at least one of said first level of predetermined movement and said second predetermined level of movement.

17. A method according to claim 13, further comprising the steps of
assigning said sensitivity of the at least one control device a value; and
storing said value in a memory.

18. A method according to claim 17, wherein restoring said sensitivity value to a default level if there is no suitable sensitivity value stored in said memory.

19. A computer program product comprising:
a computer usable medium having computer readable program code embodied therein configured to adjust a sensitivity level of a video game control device, said computer program product comprising:
computer readable code configured to cause a computer to determine whether the user has manually adjusted the sensitivity level of the video game control device; and
computer readable code configured to cause a computer to generate a signal that adjusts the sensitivity level of the video game control without interrupting control of the video game control device.

20. A computer program according to claim 19, wherein computer readable code is configured to cause a computer to determine whether the user has adjust the sensitivity of the device from a first predetermined sensitivity level to a second predetermined sensitivity level, the second predetermined level being selected from a plurality of different predetermined sensitivity levels.

21. A computer program product according to claim 19, wherein
said computer usable medium is adapted to accept a first sensitivity value that effects a first predetermined level of movement of said on screen vehicle based on a first predetermined distance of movement of said video game control device; and
said computer usable medium is further adapted to override said first sensitivity value and accept a second sensitivity value that effects a second predetermined level of movement of said on screen vehicle based on a second predetermined distance of movement of said steering mechanism.

22. A computer program product according to claim 21, wherein
when said first sensitivity value is accepted by said computer usable medium, said movement of said on screen vehicle is incapable of movement at said second predetermined level of movement.

23. A computer program according to claim 21, wherein when said second sensitivity value is accepted by said computer usable medium, said movement of said on screen vehicle is capable of movement at least one of said first level of predetermined movement and said second predetermined level of movement.

24. A computer program according to claim 19, wherein said computer usable medium includes a memory, and said sensitivity level of the at least one control device is assigned a value and stored in said memory.

25. A computer program according to claim 24, wherein said sensitivity value reverts to a default level if there is no suitable sensitivity value stored in said memory.

\* \* \* \* \*